US011021013B2

(12) United States Patent
Couture et al.

(10) Patent No.: US 11,021,013 B2
(45) Date of Patent: Jun. 1, 2021

(54) WHEELCHAIR BACKREST AND REAR WHEEL ASSEMBLY

(71) Applicant: MOTION COMPOSITES INC, Saint-Roch-de-l'Achigan (CA)

(72) Inventors: Pierre-Andre Couture, Laval (CA); Michael Archambault, Saint-Roch-de-l'Achigan (CA); Alexandre Bleau, Lachenaie (CA); Maxime Lamarre, Terrebonne (CA); Alec Stephani, Saint-Lambert (CA); David Gingras, L'Assomption (CA)

(73) Assignee: MOTION COMPOSITES INC., Saint-Roch-de-l'Achigan (CA)

( * ) Notice: Subject to any disclaimer, the term of this patent is extended or adjusted under 35 U.S.C. 154(b) by 175 days.

(21) Appl. No.: 16/081,315

(22) PCT Filed: Mar. 1, 2017

(86) PCT No.: PCT/CA2017/050274
§ 371 (c)(1),
(2) Date: Aug. 30, 2018

(87) PCT Pub. No.: WO2017/147703
PCT Pub. Date: Sep. 8, 2017

(65) Prior Publication Data
US 2019/0091080 A1 Mar. 28, 2019

Related U.S. Application Data

(60) Provisional application No. 62/310,036, filed on Mar. 18, 2016, provisional application No. 62/301,939, filed on Mar. 1, 2016.

(51) Int. Cl.
*A61G 5/10* (2006.01)
*A61G 5/02* (2006.01)
(Continued)

(52) U.S. Cl.
CPC ............ *B60B 33/0002* (2013.01); *A61G 5/10* (2013.01); *A61G 5/1056* (2013.01);
(Continued)

(58) Field of Classification Search
CPC .......... A61G 5/10; A61G 5/1056; A61G 5/02; A61G 5/1057
See application file for complete search history.

(56) References Cited

U.S. PATENT DOCUMENTS 4,503,724 A * 3/1985 Ward ..................... A61G 5/023
180/206.6
4,655,471 A * 4/1987 Peek ..................... A61G 5/1067
280/250.1

(Continued)

FOREIGN PATENT DOCUMENTS

EP 1797853 A2 6/2007
EP 2213270 A1 8/2010

*Primary Examiner* — Tony H Winner
*Assistant Examiner* — Michael R Stabley
(74) *Attorney, Agent, or Firm* — Norton Rose Fulbright Canada LLP

(57) ABSTRACT

A system of bracket assemblies for a wheelchair comprises a pair of bracket assemblies adapted to be connected to respective sides of a seat frame of the wheelchair. Each of the bracket assemblies has a base adapted to be secured to a seat frame member of the seat frame, an arm adapted to be secured to a backrest frame member of a backrest frame, and a pivot pivotally connecting the base to the arm for rotational movement of the arm relative to the base. One or more blocking mechanism blocks the rotational movement of the arm relative to the base in a use orientation of the backrest frame. A rod having opposed ends connected to the base of the pair of bracket assemblies for spacing the bracket assemblies away from one another. A rear wheel unit is also provided.

29 Claims, 10 Drawing Sheets

(51) Int. Cl.
  *A61G 5/12* (2006.01)
  *B60B 33/00* (2006.01)
  *B60B 33/04* (2006.01)
  *B60B 35/00* (2006.01)

(52) U.S. Cl.
  CPC ........ *A61G 5/1097* (2016.11); *B60B 33/0026* (2013.01); *B60B 33/0065* (2013.01); *B60B 33/0068* (2013.01); *B60B 33/04* (2013.01); *A61G 5/02* (2013.01); *A61G 5/128* (2016.11); *B60B 33/0039* (2013.01); *B60B 33/0049* (2013.01); *B60B 33/0057* (2013.01); *B60B 35/009* (2013.01); *B60B 2200/22* (2013.01); *B60B 2200/26* (2013.01)

(56) References Cited

U.S. PATENT DOCUMENTS

| | | | | |
|---|---|---|---|---|
| 5,593,173 A * | 1/1997 | Williamson | ............ | A61G 5/08 280/250.1 |
| 6,311,999 B1 * | 11/2001 | Kueschall | ................ | A61G 5/00 280/250.1 |
| 7,249,777 B2 * | 7/2007 | Schreiber | ................ | A61G 5/10 180/907 |
| 7,377,588 B2 * | 5/2008 | Schreiber | ............ | A61G 5/1067 297/354.12 |
| 8,042,824 B2 * | 10/2011 | Borisoff | ............ | A61G 5/1097 280/250.1 |
| 8,328,215 B2 * | 12/2012 | Knopf | ................. | A61G 5/0866 280/250.1 |
| 8,517,469 B1 * | 8/2013 | Hetzel | ................. | A61G 5/1067 280/250.1 |
| 8,573,622 B2 * | 11/2013 | Papi | .................... | A61G 5/0866 280/250.1 |
| 8,905,420 B2 * | 12/2014 | Spindle | .................... | A61G 5/00 280/250.1 |
| 2006/0049608 A1 | 3/2006 | Schreiber | | |
| 2011/0291387 A1 * | 12/2011 | Chang Liao | ......... | A61G 5/0891 280/647 |
| 2015/0245964 A1 | 9/2015 | Tsuber | | |

* cited by examiner

WHEELCHAIR BACKREST AND REAR WHEEL ASSEMBLY

CROSS-REFERENCE TO RELATED APPLICATIONS

The present application claims priority on U.S. Patent Application Ser. No. 62/301,939, filed on Mar. 1, 2016, and on U.S. Patent Application Ser. No. 62/310,036, filed on Mar. 18, 2016, the content of both of which is inserted herein by reference.

TECHNICAL FIELD

The present application relates to wheelchairs and, more particularly, to various components of a wheelchair assembly.

BACKGROUND ART

Wheelchairs have evolved over the years to become increasingly ergonomic, lightweight, easy to maneuver and to use. However, there remains room for improvement to add additional adjustment possibilities to wheelchairs, and to render them even more convenient to use, notably in the maneuverability, stiffness, balance, but also for moving into or out of the wheelchair, and folding or unfolding the wheelchair for storage.

SUMMARY

It is an aim of the present disclosure to provide a wheelchair backrest and rear wheel assembly that addresses issues associated with the prior art.

Therefore, in accordance with a first embodiment of the present disclosure, there is provided a system of bracket assemblies for a wheelchair comprising: a pair of bracket assemblies adapted to be connected to respective sides of a seat frame of the wheelchair, each said bracket assembly having a base adapted to be secured to a seat frame member of the seat frame, an arm adapted to be secured to a backrest frame member of a backrest frame, and a pivot pivotally connecting the base to the arm for rotational movement of the arm relative to the base; at least one blocking mechanism in at least one of the bracket assemblies to block the rotational movement of the arm relative to the base in a use orientation of the backrest frame; and a rod having opposed ends connected to the base of the pair of the bracket assemblies for spacing the bracket assemblies away from one another.

Further in accordance with the first embodiment, in an instance, the base comprises a clamp body, the clamp body configured to form a translational joint with the seat frame member until tightened to be fixed to the seat frame member.

Still further in accordance with the first embodiment, in an instance, the pivot is a bolt threadingly engaged to the base, with a bore in the arm pivotally surrounding the bolt.

Still further in accordance with the first embodiment, in an instance, a low-friction sleeve interfaces the bolt to the bore.

Still further in accordance with the first embodiment, in an instance, interlocking members on the base and on the arm and surround the bolt to isolate the bolt from a rotation of the arm.

Still further in accordance with the first embodiment, in an instance, the interlocking members are a neck in the base and a sleeve, the neck and the sleeve having interlocking features to prevent rotation of the sleeve relative to the neck when assembled.

Still further in accordance with the first embodiment, in an instance, the blocking mechanism includes a spring-loaded pin releasably engaged in mating engagement with a female connector.

Still further in accordance with the first embodiment, in an instance, the spring-loaded pin is operatively mounted to the base and the female connector is secured to the arm.

Still further in accordance with the first embodiment, in an instance, the female connector has an abutment configured for abutting the base at a given orientation of the backrest frame relative to the seat frame.

Still further in accordance with the first embodiment, in an instance, the female connector is received in a slot of the arm, and the arm has a plurality of connector holes for indexing the female connector to one of a plurality of positions in the slot.

Still further in accordance with the first embodiment, in an instance, one of said blocking mechanism is in each said bracket assembly.

Still further in accordance with the first embodiment, in an instance, the arms each have at least one clamping ring adapted to slidingly receive the backrest frame member, the clamping ring configured to form a translational joint with the backrest frame member until tightened to fix the backrest frame member.

Still further in accordance with the first embodiment, in an instance, the rod is a tie rod having an axial degree of expansion.

In accordance with a second embodiment of the present disclosure, there is provided a wheelchair comprising: a seat frame having at least a pair of seat frame members adapted to support a seat of the wheelchair; a pair of backrest frame members adapted to support a backrest of the wheelchair; a pair of bracket assemblies adapted to be connected to respective sides of a seat frame of the wheelchair, each said bracket assembly having a base adapted to be secured to a respective one of the seat frame members of the seat frame, an arm adapted to be secured to a respective one of the backrest frame member of a backrest, and a pivot pivotally connecting the base to the arm for rotational movement of the arm relative to the base; a first spacing bar rigidly interconnecting the pair of seat frame members; a second spacing bar rigidly interconnecting the pair of backrest frame members; and a rod having opposed ends connected to the base of the pair of the bracket assemblies for spacing the bracket assemblies away from one another.

Further in accordance with the second embodiment, in an instance, the pair of bracket assemblies include at least one blocking mechanism to block the rotational movement of the arm relative to the base in a use orientation of the backrest.

Still further in accordance with the second embodiment, in an instance, the base comprises a clamp body, the clamp body configured to form a translational joint with the seat frame member until tightened to be fixed to the seat frame member.

Still further in accordance with the second embodiment, in an instance, the pivot is a bolt threadingly engaged to the base, with a bore in the arm pivotally surrounding the bolt.

Still further in accordance with the second embodiment, in an instance, a low-friction sleeve interfaces the bolt to the bore.

Still further in accordance with the second embodiment, in an instance, interlocking members on the base and on the arm and surround the bolt to isolate the bolt from a rotation of the arm.

Still further in accordance with the second embodiment, in an instance, the interlocking members are a neck in the base and a sleeve, the neck and the sleeve having interlocking features to prevent rotation of the sleeve relative to the neck when assembled.

Still further in accordance with the second embodiment, in an instance, the blocking mechanism includes a spring-loaded pin releasably engaged in mating engagement with a female connector.

Still further in accordance with the second embodiment, in an instance, the spring-loaded pin is operatively mounted to the base and the female connector is secured to the arm.

Still further in accordance with the second embodiment, in an instance, the female connector has an abutment configured for abutting the base at a given orientation of the backrest frame relative to the seat frame.

Still further in accordance with the second embodiment, in an instance, the female connector is received in a slot of the arm, and the arm has a plurality of connector holes for indexing the female connector to one of a plurality of positions in the slot.

Still further in accordance with the second embodiment, in an instance, comprising one of said blocking mechanism in each said bracket assembly.

Still further in accordance with the second embodiment, in an instance, the arms each have at least one clamping ring adapted to slidingly receive the backrest frame member, the clamping ring configured to form a translational joint with the backrest frame member until tightened to fix the backrest frame member.

Still further in accordance with the second embodiment, in an instance, the rod is a tie rod having a degree of expansion.

Still further in accordance with the second embodiment, in an instance, ends of the first spacing bar and of the second spacing bars are clamps forming translation joints with the seat frame members and the backrest frame members, respectively, a tightening of the clamps fixing a position of the spacing bars along the seat frame members and the backrest frame members, respectively.

Still further in accordance with the second embodiment, in an instance, a pair of rear wheel units are mounted to the seat frame, each said rear wheel unit comprising a bar connected to the seat frame member, and a stem connected to the bar, a cylindrical receptacle being at a cantilevered end of the stem, a bushing adapted to support a rear wheel of the wheelchair along an axle axis, the bushing received in the cylindrical receptacle for rotation, and a tightening mechanism to block rotation of the bushing relative to the cylindrical receptacle.

Still further in accordance with the second embodiment, in an instance, the bar forms a joint with the seat frame member so as to be displaceable along the seat frame member, the bar having a clamp for being tightened fixed to the seat frame member.

Still further in accordance with the second embodiment, in an instance, the stem forms a joint with the bar so as to be displaceable along the bar, the stem having a clamp for being tightened fixed to the bar.

Still further in accordance with the second embodiment, in an instance, the stem projects rearwardly, and the bar and the stem define a clearance adapted to receive a corresponding one of the bracket assemblies.

Still further in accordance with the second embodiment, in an instance, the bushing adapted to support a rear wheel of the wheelchair along an axle axis, the bushing is rotatable in the cylindrical receptacle about a bushing rotational axis non coincident with the axle axis, a level on the bushing and positioned to indicate an orientation of the axle axis relative to the ground.

Still further in accordance with the second embodiment, in an instance, the tightening mechanism includes a clamp at the cylindrical receptacle for tightening the bushing in the cylindrical receptacle.

Still further in accordance with the second embodiment, in an instance, the bushing has a bore adapted to receive an axle of the rear wheel, the bore defining the axle axis.

Still further in accordance with the second embodiment, in an instance, the bore is oriented in the bushing to define a camber orientation, whereby the axle axis and the bushing rotational axis are non-parallel.

Still further in accordance with the second embodiment, in an instance, the bushing is slidable relative to the cylindrical receptacle along the bushing rotational axis to adjust a depth of the bushing in the cylindrical receptacle.

Still further in accordance with the second embodiment, in an instance, a scale is provided on the bushing to indicate the depth of the bushing in the cylindrical receptacle.

In accordance with a third embodiment of the present disclosure, there is provided a rear wheel unit for a wheelchair comprising: a structure adapted to be secured to a seat frame member of the seat frame, the structure defining a cylindrical receptacle; a bushing adapted to support a rear wheel of the wheelchair along an axle axis, the bushing received in the cylindrical receptacle and rotatable in the cylindrical receptacle about a bushing rotational axis non coincident with the axle axis; a level on the bushing and positioned to indicate an orientation of the axle axis relative to the ground; and a tightening mechanism to block rotation of the bushing relative to the cylindrical receptacle.

Further in accordance with the third embodiment, in an instance, the structure includes a bar connected to the seat frame member, and a stem connected to the bar, the cylindrical receptacle being at a cantilevered end of the stem.

Still further in accordance with the third embodiment, in an instance, the bar forms a joint with the seat frame member so as to be displaceable along the seat frame member, the bar having a clamp for being tightened fixed to the seat frame member.

Still further in accordance with the third embodiment, in an instance, the stem forms a joint with the bar so as to be displaceable along the bar, the stem having a clamp for being tightened fixed to the bar.

Still further in accordance with the third embodiment, in an instance, the tightening mechanism is a clamp at the cylindrical receptacle for tightened the bushing in the cylindrical receptacle.

Still further in accordance with the third embodiment, in an instance, the bushing has a bore adapted to receive an axle of the rear wheel, the bore defining the axle axis.

Still further in accordance with the third embodiment, in an instance, the bore is oriented in the bushing to define a camber orientation, whereby the axle axis and the bushing rotational axis are non-parallel.

Still further in accordance with the third embodiment, in an instance, the bushing is slidable relative to the cylindrical receptacle along the bushing rotational axis to adjust a depth of the bushing in the cylindrical receptacle.

Still further in accordance with the third embodiment, in an instance, a scale is provided on the bushing to indicate the depth of the bushing in the cylindrical receptacle.

BRIEF DESCRIPTION OF THE FIGURES

The present application relates to wheelchairs and, more particularly, to various components of a wheelchair assembly.

DETAILED DESCRIPTION

Figure 1:
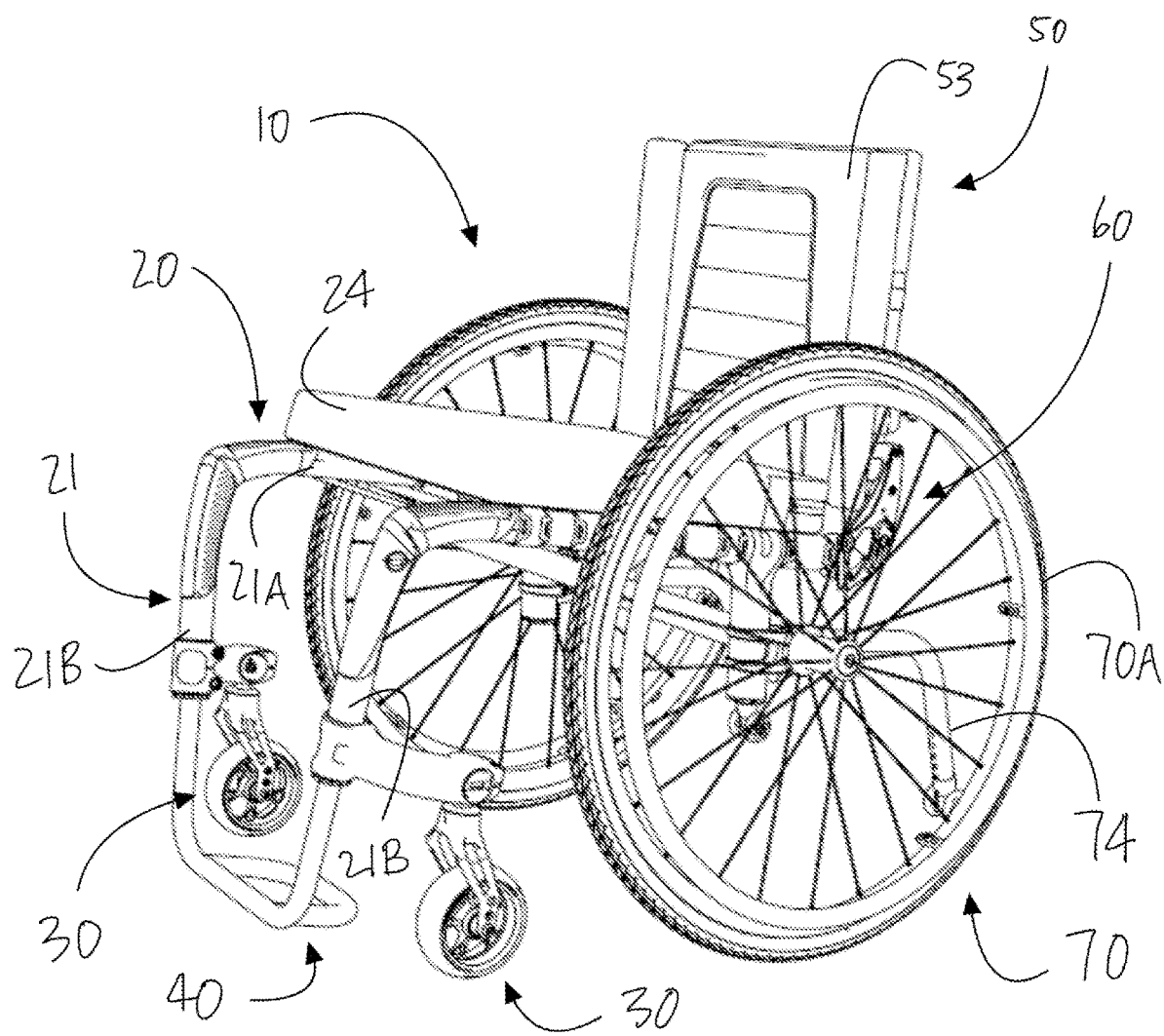
FIG. 1 is a perspective view of a wheelchair assembly in accordance with the present disclosure.
Figure 2:
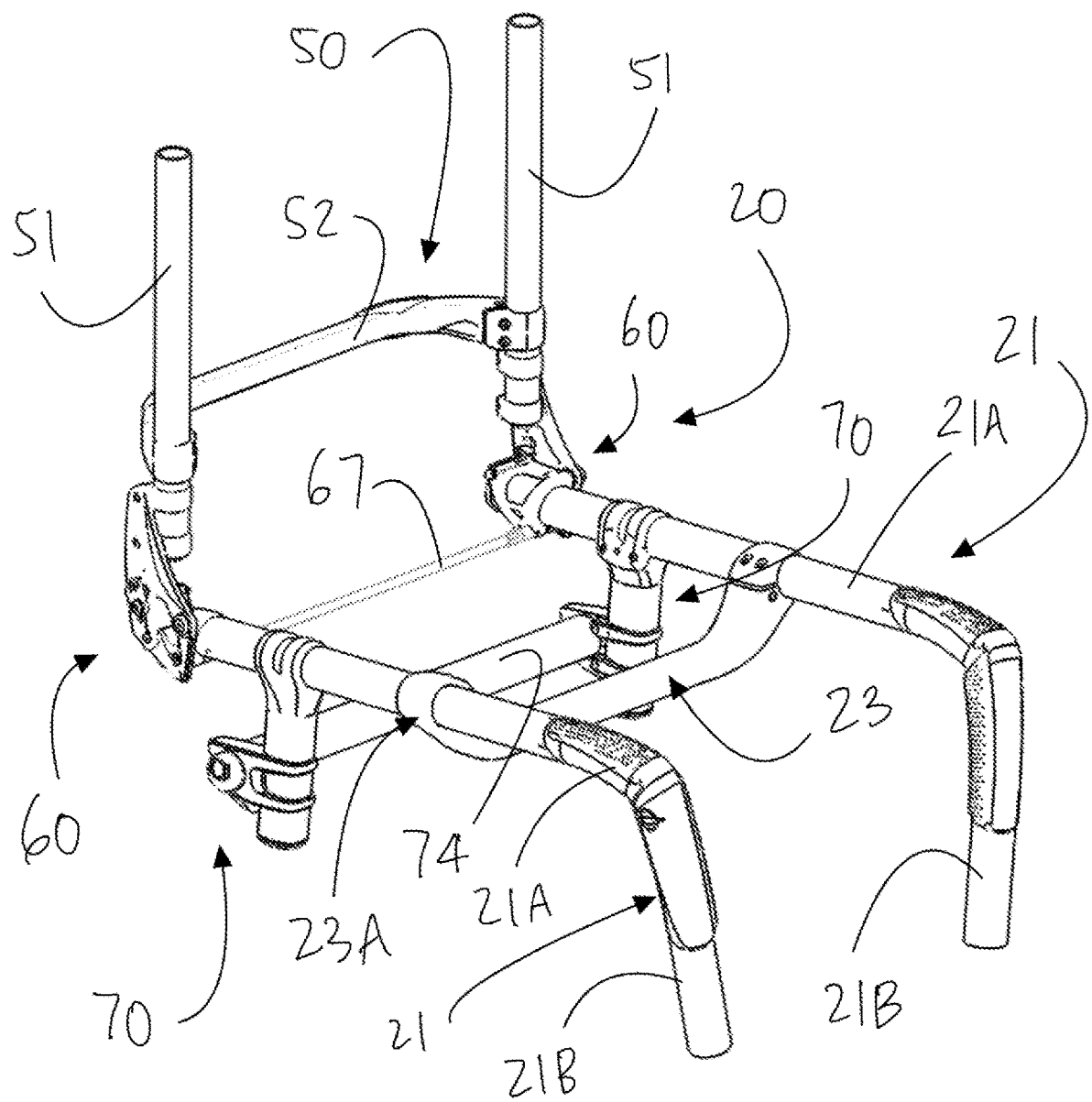
FIG. 2 is a perspective view a wheelchair frame of the wheelchair assembly of FIG. 1.

Referring to the drawings and more particularly to FIGS. 1 and 2, there is illustrated a wheelchair assembly at 10, also simply referred to as wheelchair. The wheelchair assembly 10 is of the type having a plurality of other components, including a seat frame 20, a pair of front wheel units 30, a footrest 40, a backrest frame 50, bracket assemblies 60 and rear wheel units 70.

The seat frame 20 forms the structure of the wheelchair assembly 10. The seat frame 20 has a pair of tube assemblies 21, a right-side tube assembly and a left-side tube assembly, for instance mirror images of one another. The tube assemblies 21 are shown as having a L-shape. The L-shape is one possible embodiment of the tube assemblies 21, and other shapes include a generally polygonal shape, a U-shape, etc. Although the expression "L-shape" is used, the tube assemblies 21 may appear to be a L rotated by 90 degrees clockwise or counterclockwise, depending on the point of view of the observer of the wheelchair 10 of FIG. 1. Moreover, although a right-angle bend is shown in FIG. 1, other angles may be used.

The tube assemblies 21 may include a tubular member made in any appropriate material, such as carbon fiber, composites, metals (e.g., aluminum, titanium, steel, etc), and combinations thereof. According to an embodiment, the tubular member is a monolithic tube. The tubular member may have a first portion 21A and a second portion 21B. The first portion 21A is generally horizontal when the wheelchair 10 is on its wheels, as in FIG. 1. The expression "generally horizontal" is well depicted in FIG. 1, in that the first portion 21A may or may not be substantially parallel to the ground. It is observed that the first portion 21A is in the seating zone of the wheelchair 10, and may even support a seat of the wheelchair 10, as described hereinafter. The first portion 21A may also support the bracket assemblies 60 and the rear wheel units 70. According to an embodiment, the first portion 21A has a uniform cross-section at least from its rearmost end, for the bracket assemblies 60 and the rear wheel units 70 to be translatable along the first portions 21A. For example, the first portion 21A may be of circular section.

The second portion 21B is generally vertical or generally upright when the wheelchair 10 is on its wheels, as in FIG. 1. The expression "generally vertical" is also well depicted in FIG. 1, in that the second portion 21B may or may not be substantially perpendicular to the ground. The second portion 21B is in the bottom front zone of the wheelchair 10, and may even support the front caster assemblies 30 and the footrest 40, as described hereinafter. The sectional shape of the second portion 21B may be circular as in FIG. 1.

Figure 5:
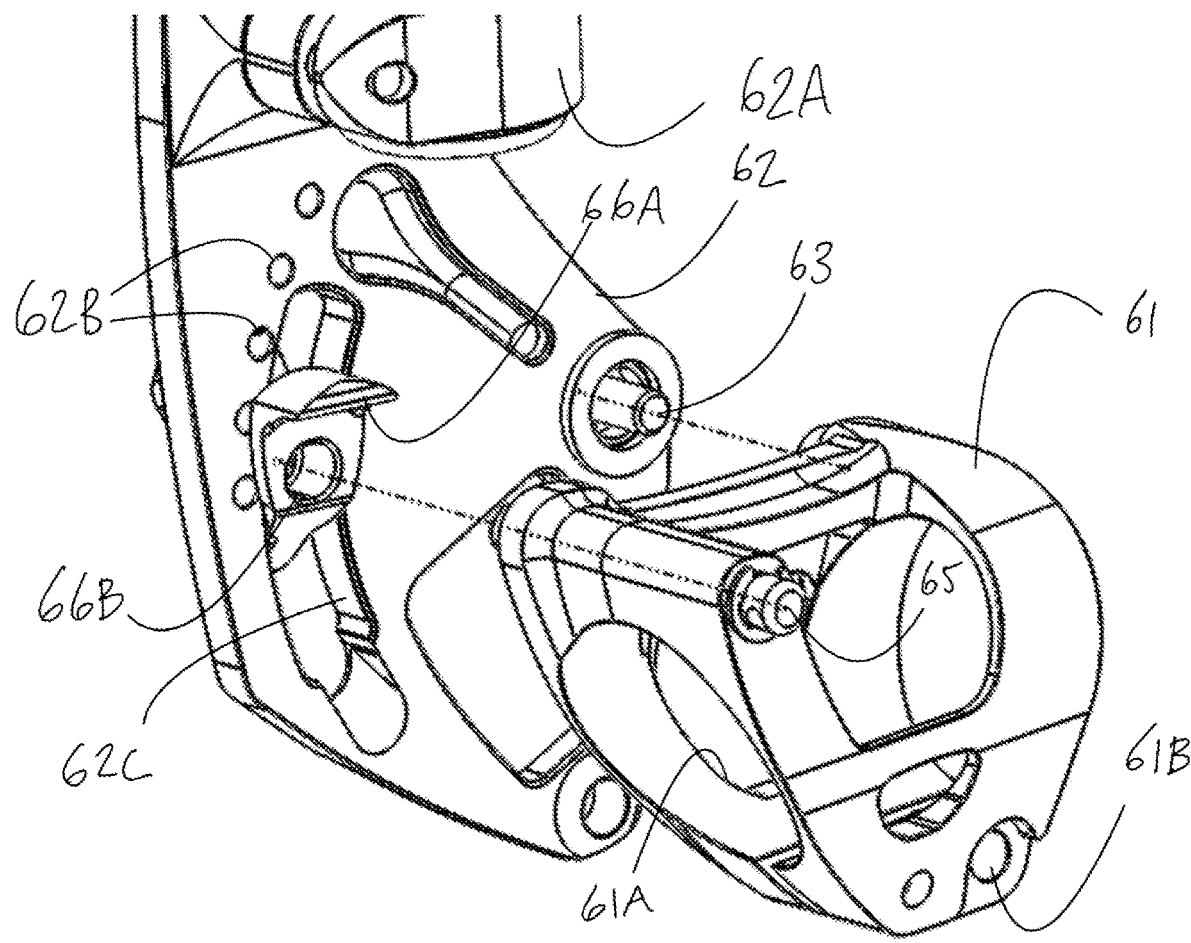
FIG. 5 is an assembly view of the bracket assembly of the wheelchair of FIG. 4.

Referring to FIGS. 2 and 5, the seat frame 20 has a spacing bar 23, also known as a rigidizer or spacing bar. The spacing bar 23 is fixed at opposed ends to the tubes 21, by clamps 23A. The spacing bar 23 is a rigid structural component, and therefore preserves the distance between the tubes 21. Unlike other spacing bars enabling a lateral contraction of the seat frame 20, the spacing bar 23 does not provide contraction capability to the seat frame 20. The seat frame 20 is also rigidified by components of the backrest frame 50, bracket assemblies 60, and/or rear wheel units 70 as described hereinafter, which operate concurrently with the spacing bar 23 to limit movement between the tubes 21. The clamps 23A may be tightened or loosened, so as to enable an adjustment of the position of the spacing bar 23 along the tube 21. As the spacing bar 23 may be the structural component that is grasped when handling the flipped-down wheelchair, the spacing bar 23 may be strategically located to balance the weight flipped-down wheelchair to facilitate manipulations. The tubes 21 being spaced apart by the spacing bar 23 may hence support a seat 24 (FIG. 1). The seat 24 may be removably connected to the seat frame 20.

Figure 3:
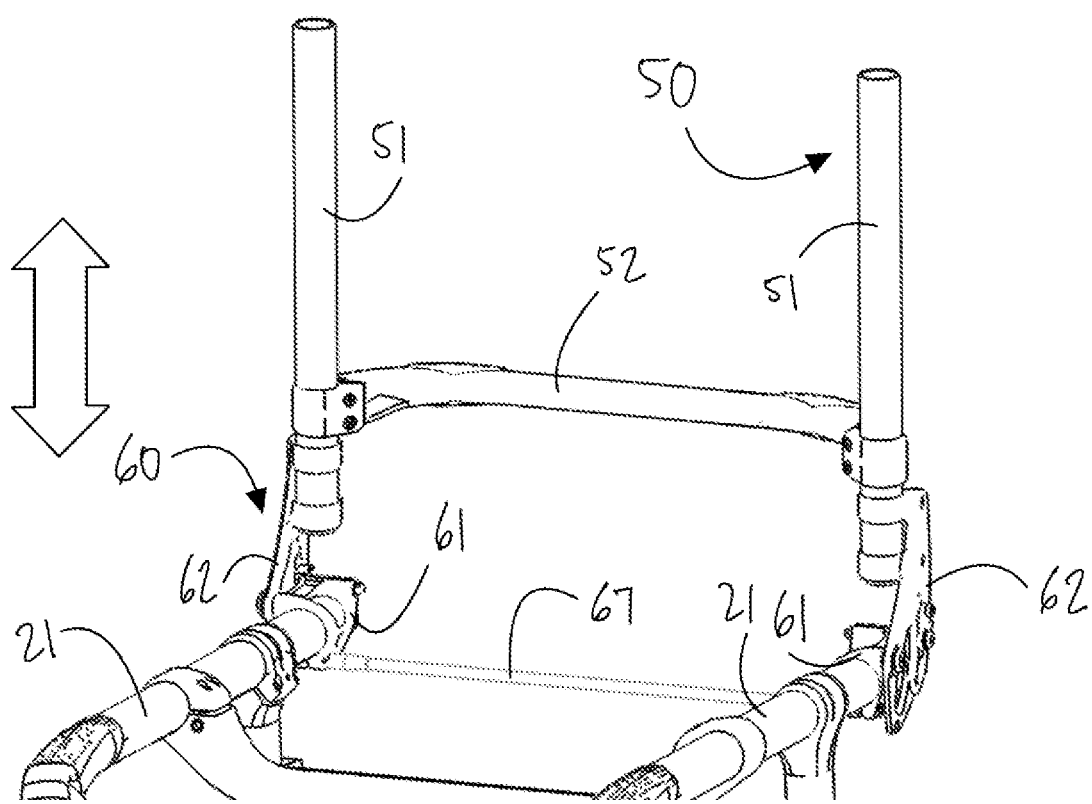
FIG. 3 is an enlarged perspective view of bracket assemblies and a backrest frame of the wheelchair of FIG. 1.

Referring to FIG. 3, the backrest frame 50 is shown connected to the seat frame 20 by the pair of bracket assemblies 60. The bracket assemblies 60 allow the flip-down feature, by which the backrest frame 50 is pivoted toward the seat frame 20, to reach a stowed configuration of the wheelchair assembly 10. The expression "bracket" is used as the assemblies 60 are tasked with supporting the backrest frame 50, among other components. The backrest frame 50 has a pair of tubes 51 spaced apart by a spacing bar 52. The spacing bar 52 is essentially similar to the spacing bar 23, whereby it will not be detailed herein. However, the spacing bar 52 may therefore be displaced along the tubes 51. The tubes 51 form the structure supporting a backrest 53 (FIG. 1). The backrest 53 may be removably secured to the tubes 51. The tubes 51 may be made of any appropriate material, such as carbon fiber, composites, metals (e.g., aluminum, titanium, steel, etc), and combinations thereof.

Figure 10:
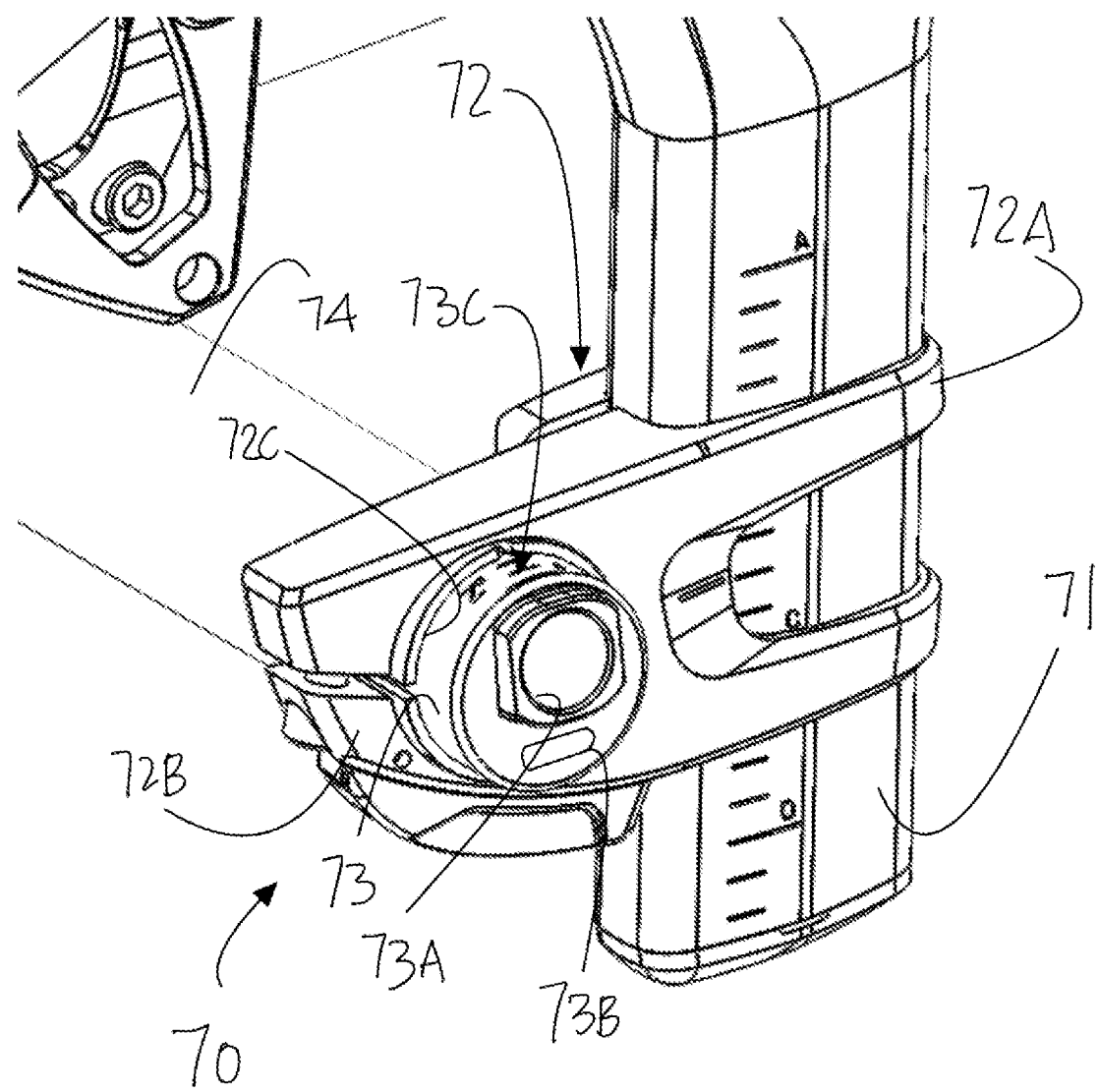
FIG. 10 is an enlarged perspective view of the rear wheel unit of the wheelchair of FIG. 1.

Referring to FIGS. 3-8, one of the bracket assemblies 60 is shown. The bracket assemblies 60 are generally mirror images of one another, whereby a single one of the bracket assemblies 60 is herein described for simplicity. Each of the bracket assemblies 60 has a base 61 by which it is secured to a respective one of the tubes 21, and an arm 62 pivotally mounted to the base 61 and supporting the backrest frame 50, to provide the flip-down feature of the wheelchair assembly 10. As shown in FIG. 10, the base 61 has a clamp body 61A, such that the base 61 may be moved along the first portions 21A of the tubes 21 to a desired position. A bore 61B may be located in the base 61 facing toward the seating zone of the wheelchair 10. This movement along the tubes 21 allows an adjustment of the depth of the backrest 53 relatively to the seat 24, to reach an arrangement customized to the user's needs. Likewise, the arms 62 have clamping rings 62A (a.k.a., collars) allowing an adjustment of the height of the backrest 53 relatively to the seat 24, again with a view to reach an arrangement customized to the user's needs. Stated differently, a translational joint/translation degree of freedom is provided between the backrest 53 and the arms 62. The arms 62 may also have a series of holes 62B and a slot 62C to determine the orientation of the backrest 53 in use.

Figure 6:
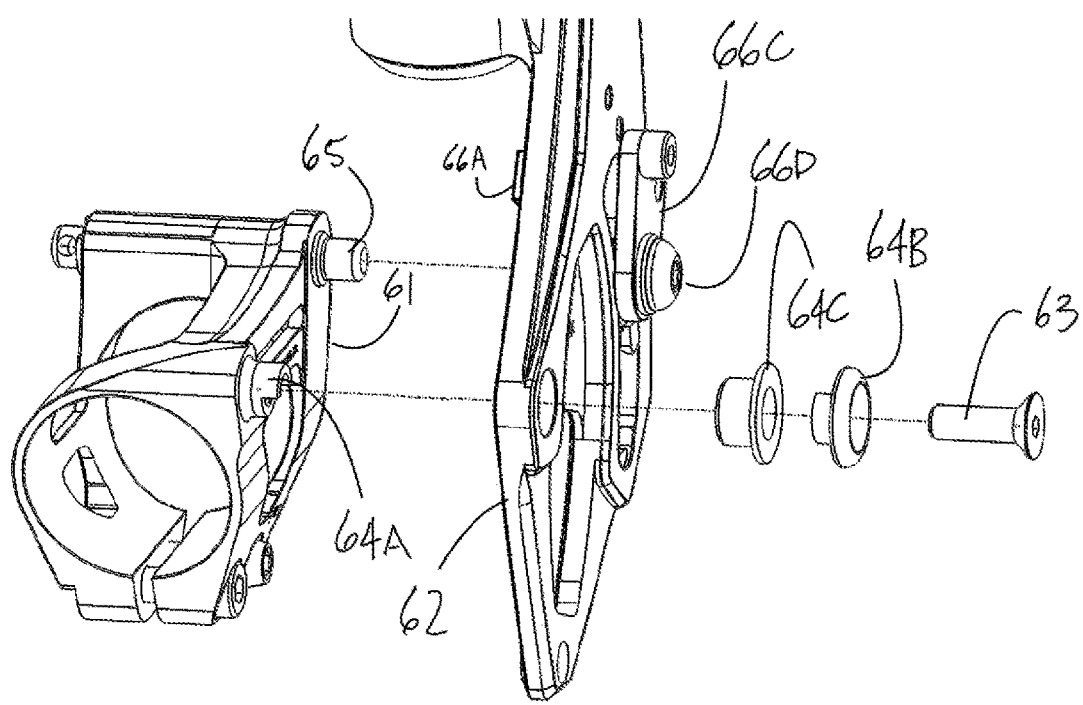
FIG. 6 is an assembly view of a pivot and interlocking members of the bracket assembly of the wheelchair of FIG. 4.
Figure 7:
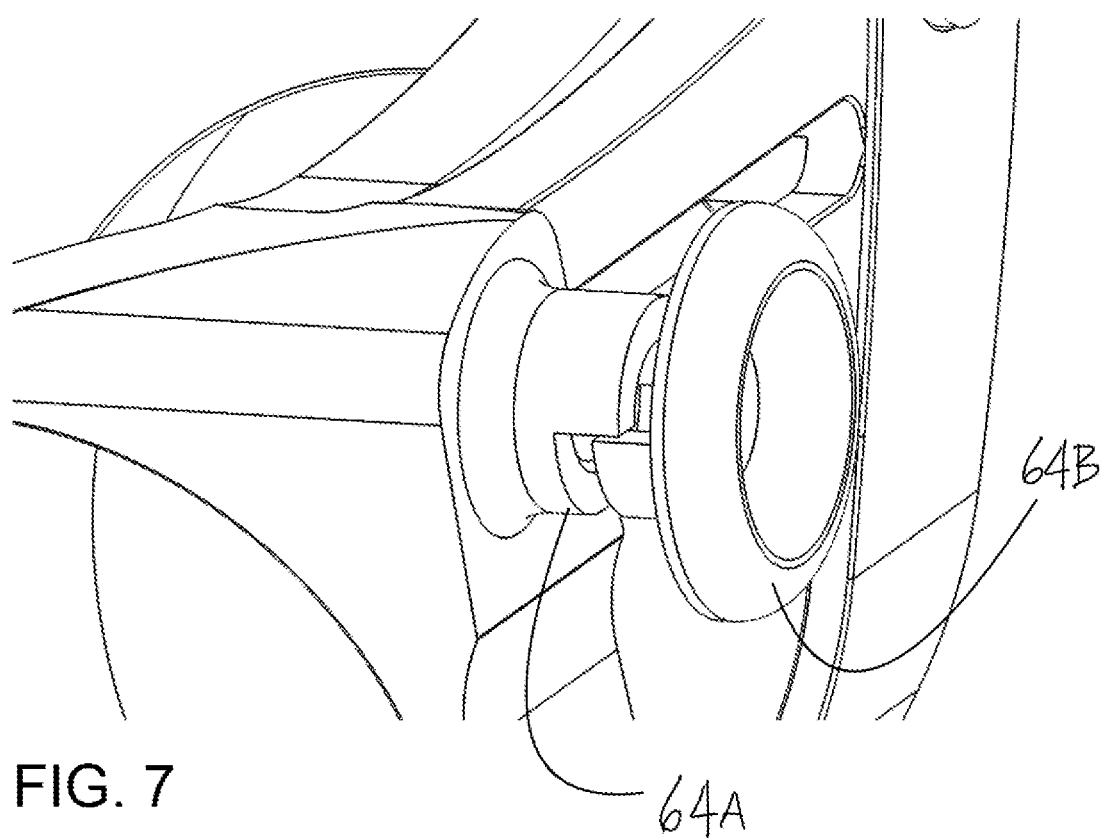
FIG. 7 is an enlarged view of the interlocking members of the bracket assembly of the wheelchair of FIG. 6.

Referring to FIGS. 5 to 7, the pivot between the base 61 and the arm 62 is generally shown at 63. In an embodiment, the pivot 63 is a bolt engaged in a threaded hole 64 in the base 61, although the opposite arrangement is contemplated as well (bolt threadingly engaged to the arm 61). To prevent a loosening of the pivot 63 because of repeated pivoting of the arm 62 relative to the base 61, an interlocking set of neck 64A and sleeve 64B surround the pivot 63 to isolate it from the rotation. An additional low-friction sleeve 64C may also surround the sleeve 64B to isolate the sleeve 64B from rotational friction in the arm 62. The expression "low-friction" denotes a coefficient of friction lower than that of the pivot 63 and bore in the arm surrounding the pivot 63. Other interlocking arrangements or members are possible, such as a pin in slots, a set screw, etc, to prevent or limit rotation of the sleeve 64B.

Figure 4:
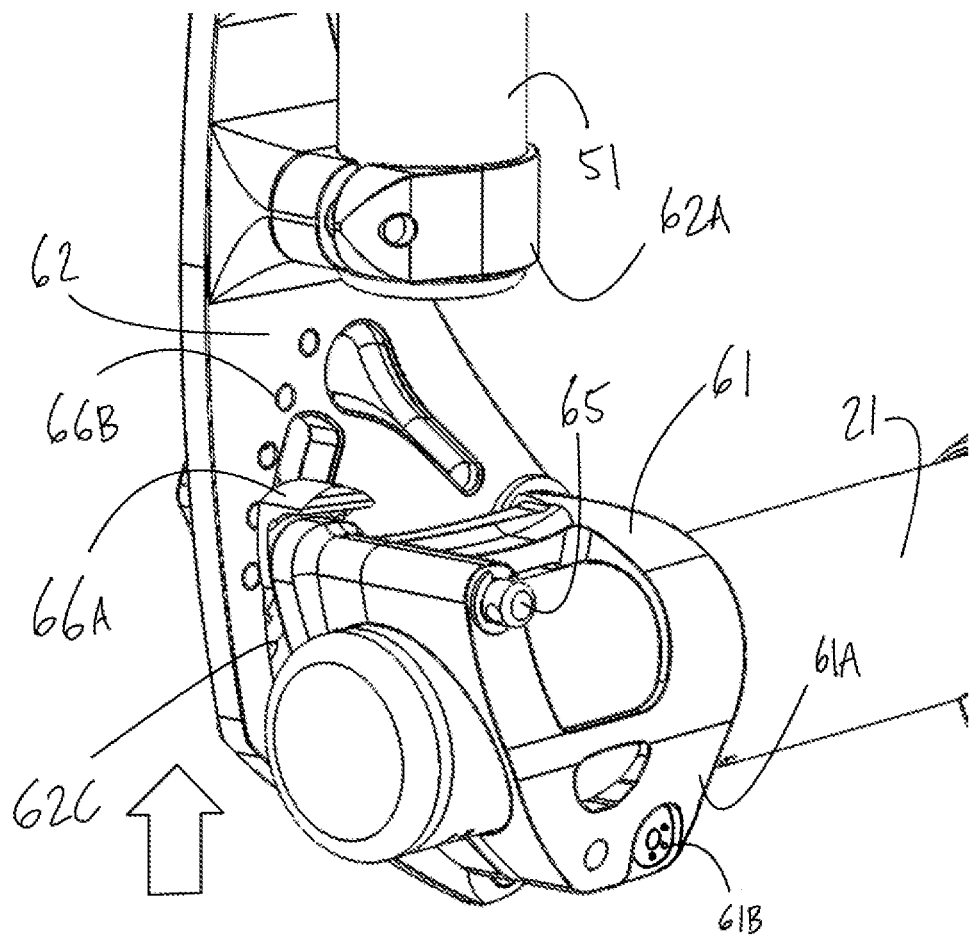
FIG. 4 is a perspective view of a left-side bracket assembly of the wheelchair of FIG. 1.
Figure 8:
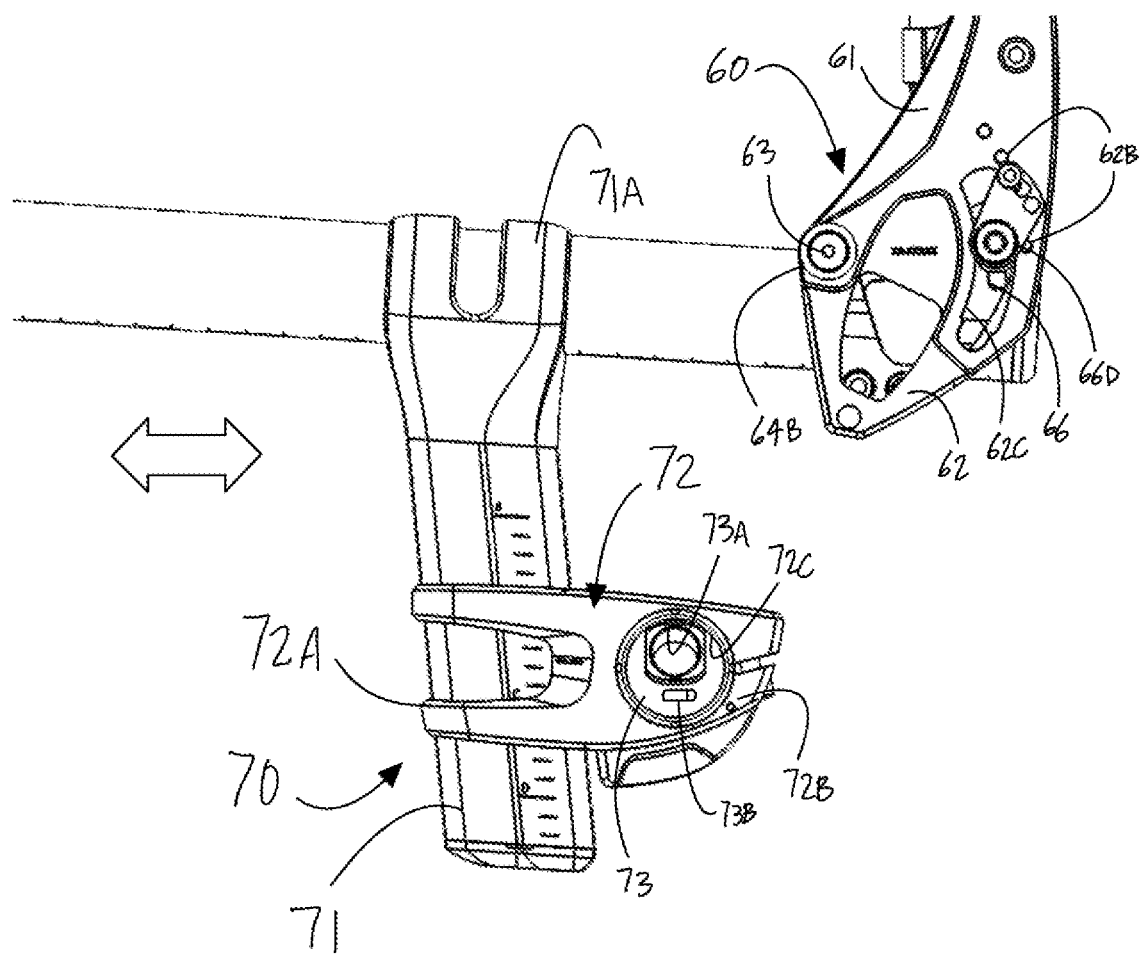
FIG. 8 is a side view of the bracket assembly and of a rear wheel unit of the wheelchair of FIG. 1.

Referring to FIGS. 4, 5 and 8, the orientation of the backrest 53 relatively to the seat 24 may be indexed into different adjustments, based on an initial adjustment. In one embodiment, this is achieved by the series of holes 62B in the arm 62, collaborating with a spring-loaded pin 65 supported by the base 61. The spring-loaded pin 65 is one of numerous male connectors that may be used, including a pin (not spring-loaded), a spring loaded ball, a plunger, a detent, a bolt, etc. A female connector 66 is secured to the arm 62 in a desired position among the possible indexed locations defined by the holes 62A. The female connector 66 has an abutment 66A that serves as a stop to limit a rearward pivoting of the arm 62. The female connector 66 also has a receptacle 66B for matingly receiving the end of the spring-loaded pin 65. The abutment 66A is located above the receptacle 66B, so as to come into abutment with the base 61 to align the spring-loaded pin 65 with the receptacle 66B. The abutment 66A also blocks the backrest 53 from falling backwards. The abutment 66A is in the slot 62B of the arm 62, whereby its position may be selected. More specifically, as shown in FIG. 8, the female connector 66 has a plate 66C connected to the receptacle 66B by a pivot 66D. The plate 66C is fixed by fasteners to a pair of the holes 62B. Therefore, the user may select a set orientation of the backrest 53, and secured to the plate 66C to the arm 62 as a function of this set orientation, or in use orientation (i.e., it is the orientation when the user is seated in the wheelchair 10). In doing so, the receptacle 66B is at a desired location. The pivot 66D may enable a rotation of the receptacle 66B when moving along the curved slot 62C. The pin 65 and female connector 66 define a blocking mechanism blocking the rotational movement of the arm 62 relative to the base 61. A single one of the bracket assemblies 60 may have such a blocking mechanism, although FIG. 1 shows that both bracket assemblies 60 have one. Moreover, a reverse arrangement is considered in which the pin 65 would be on the arm, and the female connector 66 on the base 61.

Figure 9:
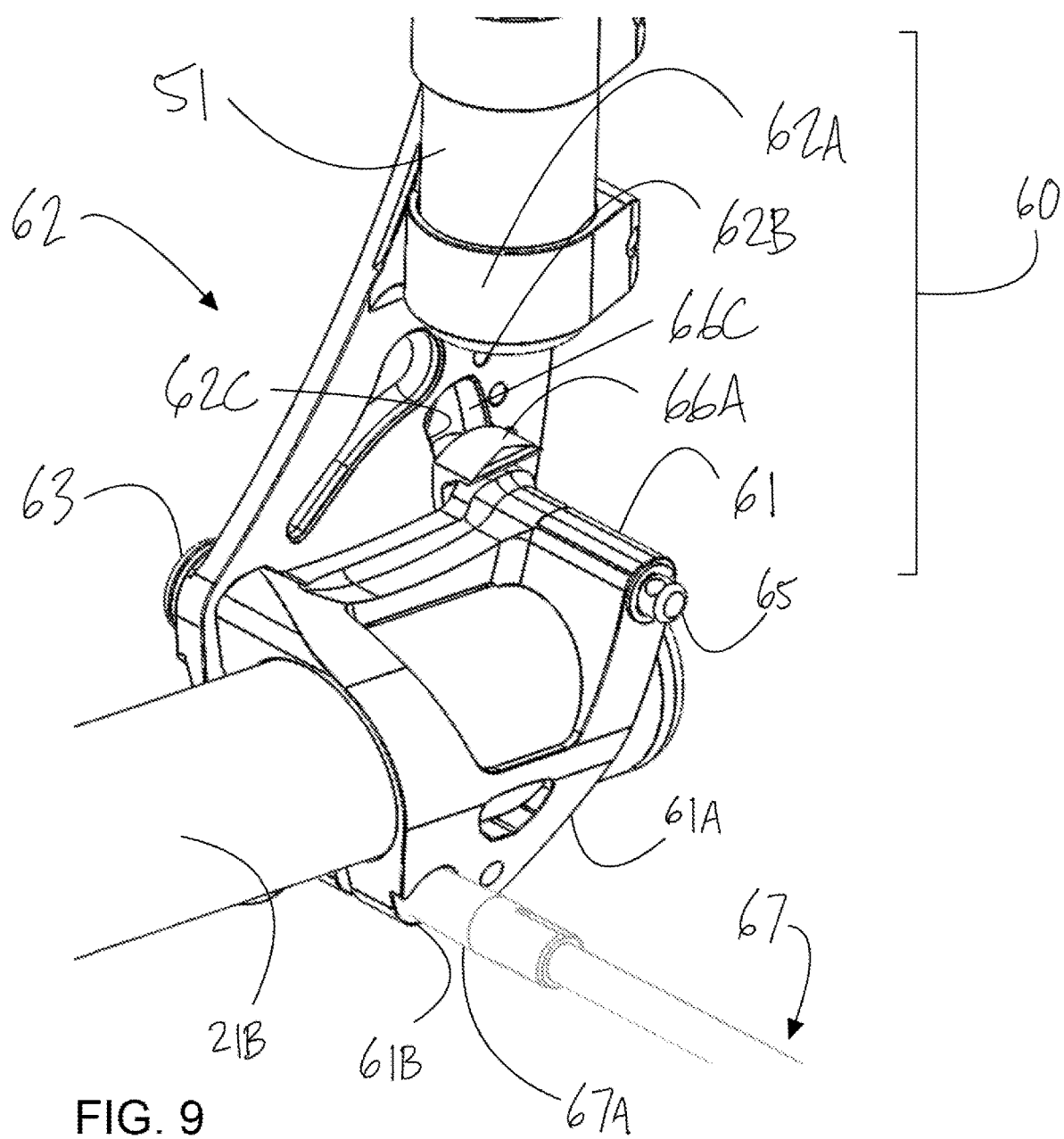
FIG. 9 is a perspective view of a right-side bracket assembly of the wheelchair of FIG. 1, with tie rod.

In terms of structural integrity of the wheelchair assembly 10, the bases 61 may be interconnected by a rod 67. The rod 67 is a third spacing bar, with the spacing bar 23 and the spacing bar 52. The rod 67 may be optional, but assists in preventing the tubes 21 from bending inwardly when the user is seated in the wheelchair assembly 10 and seat straps of the seat 24 apply a force on the tubes 21. The rod 67 may be pultruded, or may have any other construction. The rod 67 may act as a tie rod, with end caps 67A threadingly engaged to the ends of the rod 67 and received in the bores 61B as in FIG. 9. Alternatively, the rod 67 has a fixed length, selected as a function of the known spacing between the bracket assemblies 60. The length of the rod 67 is adjusted by rotation of the end caps 67A for the rod 67 to be firmly connected to the opposite bracket assemblies 60 and add stiffness to the frame 20. This adjustment of length of the rod may be regarded as an axial degree of expansion. It is observed that the wheelchair 10 has three distinct spacing members rigidly connected to the seat frame 20 in the spacing bars 23 and 52, and the rod 67. This arrangement increases the stiffness of the wheelchair assembly 10 against deformation.

Referring to FIG. 8, one of the rear wheel units 70 is shown, supporting a wheel 70A (FIG. 1). The rear wheel units 70 are generally mirror images of another other, whereby a single one of the rear wheel units 70 is herein described for simplicity. Each of the rear wheel units 70 has a structure to support the wheel 70A relative to the seat frame 20. According to an embodiment, the structure may include a bar 71 connected to a respective one of the tubes 21. The bar 71 has a clamp 71A at its end. The clamp 71A has a construction similar to previously described clamps, such that the bar 71 may be moved along the tubes 21 to a desired position. This movement along the tubes 21 allows an adjustment of the position of the rear wheels 70A relative to the seat frame 20, to reach an arrangement customized to the user's needs.

The structure of each of the rear wheel units 70 may also have a stem 72 connected to a respective one of the bars 71. The stem 72 has a clamp 72A at a first end (with bolt and nut not shown). The clamp 72A therefore enables a translation of the stem 72 relative to the bar 71, and hence allows an adjustment of the height between the wheel 70A and the seat frame 20. An opposite cantilevered end of the stem 72 defines another clamp 72B that may be tightened in similar fashion to the clamp 72A. Other structural arrangements are possible, including a support plate or frame immovably secured to the seat frame 20.

The clamp 72B forms a cylindrical receptacle 72C, by which a bushing 73 may be rotationally connected to the stem 72, about a bushing rotational axis, i.e., a rotational axis concurrently formed by and common to the cylindrical receptacle 72C and the bushing 73. The end of the stem 72 does not need to be a clamp 72B to support the cylindrical receptacle 72C. The bushing 73 has a barrel body (a.k.a., a cylindrical body) received in the circular receptacle 72C. Therefore, the bushing 73 may rotate in the circular receptacle 72C, unless the clamp 72B is tightening to block a rotation of the bushing 73, by any appropriate tightening mechanism (e.g., set screws). A bore 73A is defined in the bushing 73, for receiving the quick-connect axle of the wheel 70A. The bore 73A therefore has an axle axis as it will receive the axle of the wheel 70A. A spirit level 73B (or any other type of level) may be mounted to the barrel bushing 73, and is aligned with a rotational axis of the bore 73A, i.e., the axle axis. The spirit level 73B may be required in instances in which a wheel camber is desired. In such cases, a plane of the wheel 70A is not perpendicular relative to the ground. The bore 73A in the bushing 73, and thus the axle axis, is angled to propose a predetermined camber. However, to reach such camber without a toe-in or toe-out condition, it is necessary that the bushing 73 be properly oriented, and the spirit level 73B may be aligned with the bore 70A to achieve the desired orientation of the bushing 73 relative to the stem 72, by having the spirit level 73B parallel to the ground for example. The rear wheel units 70 may also support the anti-tip bars 74, as observed in FIG. 1. The spirit level 73B allows an alignment when the axle axis and the bushing rotational axis are non coincident due to the eccentric position of the axle axis (e.g., for example for the left-side and right-side wheels to be at the same position relative to the seat frame 20). Moreover, in the case of a camber, the axle axis and the bushing rotational axis are not parallel to one another, and thus the spirit level 73B may assist in aligning them. As an alternative to the bore 73A, the bushing 73 may comprise an axle for supporting the wheel 70A. In such a case, the spirit level 73B would also be aligned with the axle axis.

The depth of insertion of the bushing 73 in the circular receptacle 72C may also be adjusted. The depth of insertion of the bushing 73 will have an impact on the footprint of the wheels 70A, which may hence be adjusted based on the user's preference, and to modify the clearance between the wheels 70A and the backrest frame 50 and the bracket assemblies 60. For this purpose, as shown in FIG. 10, the bushing 73 may be provided with a scale 73C thereon to indicate a depth of insertion. This may facilitate the adjustment of the bushings 73 on both sides of the wheelchair, to have the same depth of insertion.

The axis of rotation of the wheels 70A is therefore adjustable in position relative to the seat frame 20, by way of the arrangement of the bars 71 and stems 72. The axis may be movable in two translational degrees of freedom, without the need to remove or dissemble any component of the rear wheel units 70 or of the seat frame 20. It is also observed that the combined shape of the bars 72 and stems 72 forms a clearance A that may complementarily receive the bracket assemblies 60. Hence, the rear wheel units 70 can be brought in close proximity to the bracket assemblies 60 is desired, with the stems 72 being under the bracket assemblies 60. The axis of rotation of the wheels 70A may also be under the bracket assemblies 60 if desired.

As best seen in FIG. 2, an axle tube 74 may interrelated the rear wheel units 70. The axle tube 74 may rigidify the seat frame 20. The axle tube 74 is practical in ensuring that the rear wheel units 70 are aligned along the seat frame 20, and may serve as a support to attach other components.

The invention claimed is:

1. A system of bracket assemblies for a wheelchair comprising:
a pair of bracket assemblies adapted to be connected to respective sides of a seat frame of the wheelchair, each said bracket assembly having
a base adapted to be secured to a seat frame member of the seat frame,
an arm adapted to be secured to a backrest frame member of a backrest frame, and
a pivot pivotally connecting the base to the arm for rotational movement of the arm relative to the base;
at least one blocking mechanism in at least one of the bracket assemblies to block the rotational movement of the arm relative to the base in a use orientation of the backrest frame, the blocking mechanism including a spring-loaded connector releasably engaged in mating engagement with a female connector; and
a rod separate from the pivot and having opposed ends connected to the base of the pair of the bracket assemblies for spacing the bracket assemblies away from one another.

2. The system according to claim 1, wherein the base comprises a clamp body, the clamp body configured to form a translational joint with the seat frame member until tightened to be fixed to the seat frame member.

3. The system according to claim 1, wherein the pivot is a bolt threadingly engaged to the base, with a bore in the arm pivotally surrounding the bolt.

4. The system according to claim 3, further comprising a low-friction sleeve interfacing the bolt to the bore.

5. The system according to claim 3, further comprising interlocking members on the base and on the arm and surrounding the bolt to isolate the bolt from a rotation of the arm.

6. The system according to claim 5, wherein the interlocking members are a neck in the base and a sleeve, the neck and the sleeve having interlocking features to prevent rotation of the sleeve relative to the neck when assembled.

7. The system according to claim 1, wherein the female connector has an abutment configured for abutting the base at a given orientation of the backrest frame relative to the seat frame.

8. The system according to claim 1, wherein the female connector is received in a slot of the arm, and the arm has a plurality of connector holes for indexing the female connector to one of a plurality of positions in the slot.

9. The system according to claim 1, comprising one of said blocking mechanism in each said bracket assembly.

10. The system according to claim 1, wherein the arms each have at least one clamping ring adapted to slidingly receive the backrest frame member, the clamping ring configured to form a translational joint with the backrest frame member until tightened to fix the backrest frame member.

11. The system according to claim 1, wherein the rod is a tie rod having an axial degree of expansion.

12. A rear wheel unit for a wheelchair comprising:
a structure adapted to be secured to a seat frame member of the seat frame, the structure defining a cylindrical receptacle;
a bushing adapted to support a rear wheel of the wheelchair along an axle axis, the bushing received in the cylindrical receptacle and rotatable in the cylindrical receptacle about a bushing rotational axis non coincident with the axle axis;
a level on the bushing and positioned to indicate an orientation of the axle axis relative to the ground; and
a tightening mechanism to block rotation of the bushing relative to the cylindrical receptacle.

13. The rear wheel unit according to claim 12, wherein the structure includes a bar connected to the seat frame member, and a stem connected to the bar, the cylindrical receptacle being at a cantilevered end of the stem.

14. The rear wheel unit according to claim 13, wherein the bar forms a joint with the seat frame member so as to be displaceable along the seat frame member, the bar having a clamp for being tightened fixed to the seat frame member.

15. The rear wheel unit according to claim 13, wherein the stem forms a joint with the bar so as to be displaceable along the bar, the stem having a clamp for being tightened fixed to the bar.

16. The rear wheel unit according to claim 13, wherein the tightening mechanism is a clamp at the cylindrical receptacle for tightened the bushing in the cylindrical receptacle.

17. The rear wheel unit according to claim 13, wherein the bushing has a bore adapted to receive an axle of the rear wheel, the bore defining the axle axis.

18. The rear wheel unit according to claim 17, wherein the bore is oriented in the bushing to define a camber orientation, whereby the axle axis and the bushing rotational axis are non-parallel.

19. The rear wheel unit according to claim 13, wherein the bushing is slidable relative to the cylindrical receptacle along the bushing rotational axis to adjust a depth of the bushing in the cylindrical receptacle.

20. The rear wheel unit according to claim 19, wherein a scale is provided on the bushing to indicate the depth of the bushing in the cylindrical receptacle.

21. A system of bracket assemblies for a wheelchair comprising:
a pair of bracket assemblies adapted to be connected to respective sides of a seat frame of the wheelchair, each said bracket assembly having
a base adapted to be secured to a seat frame member of the seat frame, the base including a clamp body, the clamp body configured to form a translational joint with the seat frame member until tightened to be fixed to the seat frame member,
an arm adapted to be secured to a backrest frame member of a backrest frame, and
a pivot pivotally connecting the base to the arm for rotational movement of the arm relative to the base;
at least one blocking mechanism in at least one of the bracket assemblies to block the rotational movement of the arm relative to the base in a use orientation of the backrest frame; and
a rod separate from the pivot and having opposed ends connected to the base of the pair of the bracket assemblies for spacing the bracket assemblies away from one another.

22. The system according to claim 21, wherein the pivot is a bolt threadingly engaged to the base, with a bore in the arm pivotally surrounding the bolt.

23. The system according to claim 22, further comprising a low-friction sleeve interfacing the bolt to the bore.

24. The system according to claim 22, further comprising interlocking members on the base and on the arm and surrounding the bolt to isolate the bolt from a rotation of the arm.

25. The system according to claim 24, wherein the interlocking members are a neck in the base and a sleeve, the neck and the sleeve having interlocking features to prevent rotation of the sleeve relative to the neck when assembled.

26. The system according to claim 21, comprising one of said blocking mechanism in each said bracket assembly.

27. The system according to claim 21, wherein the arms each have at least one clamping ring adapted to slidingly receive the backrest frame member, the clamping ring configured to form a translational joint with the backrest frame member until tightened to fix the backrest frame member.

28. The system according to claim 21, wherein the rod is a tie rod having an axial degree of expansion.

29. A system of bracket assemblies for a wheelchair comprising:
a pair of bracket assemblies adapted to be connected to respective sides of a seat frame of the wheelchair, each said bracket assembly having
a base adapted to be secured to a seat frame member of the seat frame,
an arm adapted to be secured to a backrest frame member of a backrest frame, and
a pivot pivotally connecting the base to the arm for rotational movement of the arm relative to the base;
at least one blocking mechanism in at least one of the bracket assemblies to block the rotational movement of the arm relative to the base in a use orientation of the backrest frame; and
a rod separate from the pivot and having opposed ends connected to the base of the pair of the bracket assemblies for spacing the bracket assemblies away from one another, the rod being a tie rod having an axial degree of expansion.

* * * * *